3,248,390
19-NOR-10α-PREGNENE AND Δ[1(10)]-19-NOR-
5α-PREGNENE COMPOUNDS
Albert Bowers and Otto Halpern, Mexico City, Mexico,
assignors to Syntex Corporation, Panama, Panama, a
corporation of Panama
No Drawing. Filed Oct. 10, 1963, Ser. No. 315,349
24 Claims. (Cl. 260—239.55)

The present invention relates to novel cyclopentanophenanthrene derivatives and to a process for the production thereof.

More particularly the present invention relates to novel 19-nor-10α-pregnene and Δ[1(10)]-19-nor-5α-pregnene compounds.

The novel compounds of the present invention may be represented by the following formulae:

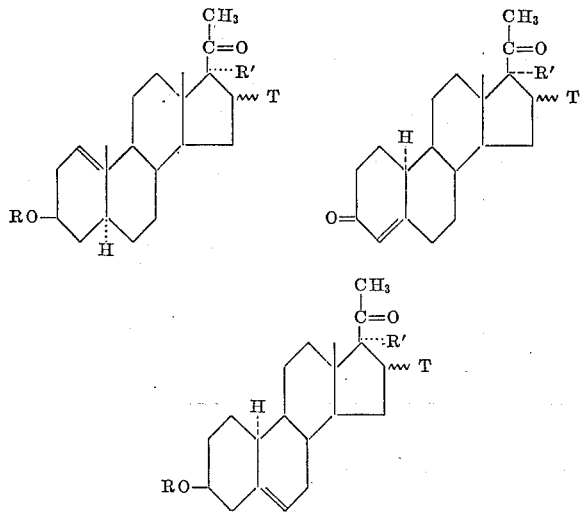

In the above formulae, R represents hydrogen or a hydrocarbon carboxylic acyl group of less than 12 carbon atoms; $R^1$ represents hydrogen, hydroxyl, or a hydrocarbon carboxylic acyloxy group of less than 12 carbon atoms, T represents hydrogen, α-methyl or β-methyl; and $R^1$ and T together represent the group

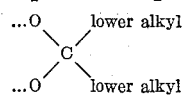

at the 16α,17α-position.

The acyl and acyloxy groups are derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds represented by the above formulae are powerful progestational agents with good oral activity. In addition they have anti-androgenic, anti-gonadotrophic and anti-estrogenic properties and are very useful in fertility control. Furthermore, they may be used in the treatment of premenstrual tension and exhibit blood cholesterol lowering and diuretic activities.

The novel compounds of the present invention are prepared by the process exemplified as follows:

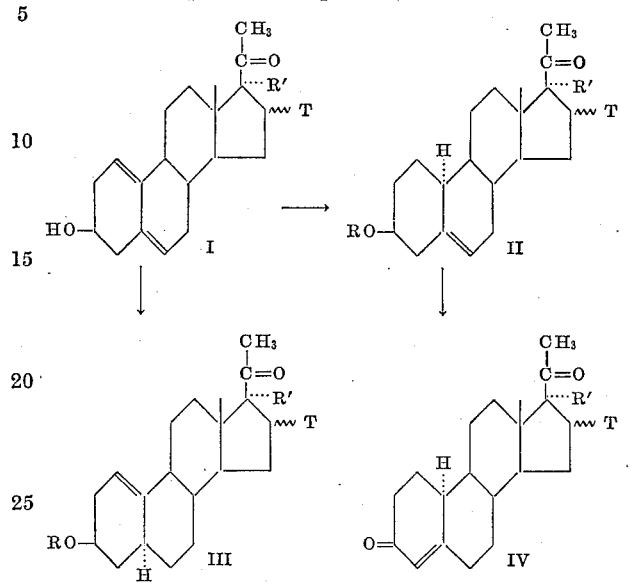

In the above formulae R, $R^1$ and T have the same meaning as set forth hereinbefore.

The starting compound (I) of the present process is a Δ[1(10),5]-pregnadien-3β-ol-20-one derivative which is prepared according to our copending U.S. patent application Serial No. 293,831, filed July 9, 1963, from the corresponding 6-hydroxy-Δ[5(10)]-compound by dehydration in the presence of an acid, e.g., acetic acid, at 100° C. for approximately 1 hour. The 6-hydroxy-Δ[5(10)]-compound may, in turn, be produced from the corresponding 6-ketone by conventional reduction.

In practicing the process outlined above, the starting Δ[1(10),5]-19-nor-pregnadien-3β-ol-20-one derivative (I) is treated with hydrogen in the presence of a suitable catalyst such as palladium in a number of forms, for example 5% palladium on calcium carbonate, 5% palladium on charcoal, etc., in a suitable organic solvent, preferably a lower alkanol such as methanol, until the absorption ceases, thus affording a product which upon conventional chromatography gives, surprisingly, a predominant amount of the corresponding Δ[5]-19-nor-10α-pregnen-3β-ol-20-one (II) and, in much smaller quantities, the corresponding Δ[1(10)]-19-nor-5α-pregnen-3β-ol-20-one derivative (III). Upon treatment of the Δ[5]-19-nor-10α-pregnen-3β-ol-20-one componds (II) under conventional Oppenauer conditions there are produced the corresponding novel Δ[4]-19-nor-10α-pregnene-3,20-dione derivatives (IV).

The compounds of the present invention having a secondary hydroxyl group are conventionally acylated in pyridine with an acylating agent, such as an anhydride or a chloride of a hydrocarbon carboxylic acid of the type described hereinbefore, to give the corresponding acylates.

The compounds of the present invention having in the molecule a tertiary hydroxyl group, i.e., at C–17, are conventionally esterified in the presence of p-toluenesulfonic acid with an acylating agent, such as acetic anhydride, caproic anhydride, cyclopentylpropionic anhydride, or enanthic anhydride, to produce the corresponding esters.

The hydrogenation step of the above process when applied to compounds of the androstane series, e.g., $\Delta^{1(10),5}$-19-nor-androstadiene-3$\beta$-ol-17-one, etc., yields similarly a predominant amount of the corresponding $\Delta^5$-19-nor-10$\alpha$-androstene derivatives and the corresponding $\Delta^{1(10)}$-19-nor-5$\alpha$-androstene compounds in smaller yield, which is in accordance with our copending U.S. Patent application Serial No. 315,390, filed of even date now abandoned. The process therefore, is a general method for producing predominantly $\Delta^5$-19-nor-10$\alpha$-steroids of the androstane and pregnane series from the corresponding $\Delta^{1(10),5}$-dienes.

The following specific examples serve to illustrate but are not intended to limit the scope of the present invention:

*Example I*

A suspension of 0.5 g. of 5% palladium on charcoal catalyst in 50 cc. of methanol was hydrogenated for 30 minutes. A solution of 2 g. of $\Delta^{1(10),5}$-19-nor-pregnadien-3$\beta$-ol-20-one (obtained in accordance with our copending U.S. patent application Serial No. 293,831, filed July 9, 1963) in 200 cc. of methanol was added to the catalyst and stirred under a hydrogen atmosphere until the uptake of hydrogen ceased. After removal of the catalyst by filtration the solution was evaporated and the crude residue was chromatographed on alumina and the solid fractions purified by crystallization from methylene chloride-hexane, thus giving predominantly $\Delta^5$-19-nor-10$\alpha$-pregnen-3$\beta$-ol-20-one (Cpd. No. 1) in a much smaller amount $\Delta^{1(10)}$ - 19 - nor-5$\alpha$-pregnen-3$\beta$-ol-20-one (Cpd. No. 2).

The starting compounds listed hereinafter under A, obtained in accordance with our aforesaid application were treated according to the above procedure, thus yielding predominantly the corresponding compounds set forth under B and in small amounts those disclosed under C:

| A | Cpd. No. | B | Cpd. No. | C |
|---|---|---|---|---|
| 16$\alpha$-methyl-$\Delta^{1(10),5}$-19-nor-pregnadien-3$\beta$-ol-20-one. | 3 | 16$\alpha$-methyl-$\Delta^5$-19-nor-10$\alpha$-pregnen-3$\beta$-ol-20-one. | 8 | 16$\alpha$-methyl-$\Delta^{1(10)}$-19-nor-5$\alpha$-pregnen-3$\beta$-ol-20-one. |
| 16$\beta$-methyl-$\Delta^{1(10),5}$-19-nor-pregnadien-3$\beta$-ol-20-one. | 4 | 16$\beta$-methyl-$\Delta^5$-19-nor-10$\alpha$-pregnen-3$\beta$-ol-20-one. | 9 | 16$\beta$-methyl-$\Delta^{1(10)}$-19-nor-5$\alpha$-pregnen-3$\beta$-ol-20-one. |
| 16$\alpha$,17$\alpha$-isopropylidenedioxy-$\Delta^{1(10),5}$-19-nor-pregnadien-3$\beta$-ol-20-one. | 5 | 16$\alpha$,17$\alpha$-isopropylidene-dioxy-$\Delta^5$-19-nor-10$\alpha$-pregnen-3$\beta$-ol-20-one. | 10 | 16$\alpha$,17$\alpha$-isopropylidenedioxy-$\Delta^{1(10)}$-19-nor-5$\alpha$-pregnen-3$\beta$-ol-20-one. |
| $\Delta^{1(10),5}$-19-nor-pregnadiene-3$\beta$,17$\alpha$-diol-20-one. | 6 | $\Delta^5$-19-nor-10$\alpha$-pregnene-3$\beta$,17$\alpha$-diol-20-one. | 11 | $\Delta^{1(10)}$-19-nor-5$\alpha$-pregnene-3$\beta$,17$\alpha$-diol-20-one. |
| 16$\alpha$-methyl-$\Delta^{1(10),5}$-19-nor-pregnadiene 3$\beta$,17$\alpha$-diol-20-one. | 7 | 16$\alpha$-methyl-$\Delta^5$-19-nor-10$\alpha$-pregnene-3$\beta$,17$\alpha$-diol-20-one. | 12 | 16$\alpha$-methyl-$\Delta^{1(10)}$-19-nor-5$\alpha$-pregnen-3$\beta$,17$\alpha$-diol-20-one. |

*Example II*

A solution of 1 g. of compound No. 1 in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 45 minutes; 4 cc. of acetic acid were added and the solvents removed by steam distillation. The product was extracted several times with ethyl acetate and the organic extracts washed with 5% hydrochloric acid solution, water 10% sodium carbonate solution and water until neutral, dried over anhydrous sodium sulfate and evaporated to dryness. Crystallization from acetone-hexane afforded $\Delta^4$-19-nor-10$\alpha$-pregnene-3,20-dione (Cpd. No. 13).

Upon treatment of compound No. 2 by the same procedure there was produced $\Delta^1$-19-nor-5$\alpha$-pregnene-3,20-dione (Cpd. No. 14).

*Example III*

The compounds Nos. 3 to 12, inclusive, were treated according to Example II, thus giving respectively:

Cpd. No.:
15. 16$\alpha$-methyl-$\Delta^4$-19-nor-10$\alpha$-pregnene-3,20-dione,
16. 16$\beta$-methyl-$\Delta^4$-19-nor-10$\alpha$-pregnene-3,20-dione,
17. 16$\alpha$,17$\alpha$ - isopropylidenedioxy - $\Delta^4$ - 19-nor-10$\alpha$-pregnene-3,20-dione,
18. $\Delta^4$-19-nor-10$\alpha$-pregnen-17$\alpha$-ol-3,20-dione,
19. 16$\alpha$ - methyl - $\Delta^4$ - 19-nor-10$\alpha$-pregnen-17$\alpha$-ol-3,20-dione,
20. 16$\alpha$-methyl-$\Delta^1$-19-nor-5$\alpha$-pregnene-3,20-dione,
21. 16$\beta$-methyl-$\Delta^1$-19-nor-5$\alpha$-pregnene-3,20-dione,
22. 16$\alpha$,17$\alpha$ - isopropylidenedioxy - $\Delta^1$ - 19-nor-5$\alpha$-pregnene-3,20-dione,
23. $\Delta^1$-19-nor-5$\alpha$-pregnen-17$\alpha$-ol-3,20-dione,
24. 16$\alpha$ - methyl - $\Delta^1$ - 19 - nor - 5$\alpha$-pregnen-17$\alpha$-ol-3,20-dione.

*Example IV*

A mixture of 1 g. of compound No. 1, 4 cc. of pyridine and 2 cc. of acetic anhydride was kept at room temperature overnight, poured into ice water, the formed precipitate was filtered, washed with water and dried. Crystallization from acetone-hexane gave $\Delta^5$-19-nor-10$\alpha$-pregnen-3$\beta$-ol-20-one acetate (Cpd. No. 25).

The compounds Nos. 2 to 12, inclusive were treated by the above procedure, thus furnishing respectively:

Cpd. No.:
26. $\Delta^{1(10)}$-19-nor-5$\alpha$-pregnen-3$\beta$-ol-20-one acetate,
27. 16$\alpha$ - methyl - $\Delta^5$ - 19 - nor-10$\alpha$-pregnen-3$\beta$-ol-20-one acetate,
28. 16$\beta$ - methyl - $\Delta^5$ - 19 - nor - 10$\alpha$ - pregnen-3$\beta$-ol-20-one acetate,
29. 16$\alpha$,17$\alpha$ - isopropylidenedioxy - $\Delta^5$ - 19-nor-10$\alpha$-pregnen-3$\beta$-ol-20-one acetate,
30. $\Delta^5$ - 19 - nor - 10$\alpha$ - pregnene-3$\beta$,17$\alpha$-diol-20-one 3-acetate,
31. 16$\alpha$ - methyl - $\Delta^5$ - 19 - nor-10$\alpha$-pregnene-3$\beta$,17$\alpha$-diol-20-one 3-acetate,
32. 16$\alpha$ - methyl - $\Delta^{1(10)}$-19-nor-5$\alpha$-pregnen-3$\beta$-ol-20-one acetate,
33. 16$\beta$ - methyl - $\Delta^{1(10)}$-19-nor-5$\alpha$-pregnen-3$\beta$-ol-20-one acetate,
34. 16$\alpha$,17$\alpha$ - isopropylidenedioxy - $\Delta^{1(10)}$-19-nor-5$\alpha$-pregnen-3$\beta$-ol-20-one acetate,
35. $\Delta^{1(10)}$ - 19 - nor - 5$\alpha$-pregnene-3$\beta$,17$\alpha$-diol-20-one 3-acetate.
36. 16$\alpha$ - methyl - $\Delta^{1(10)}$ - 19-nor-5$\alpha$-pregnene-3$\beta$,17$\alpha$-diol-20-one 3-acetate.

*Example V*

The starting compounds of Example IV were treated following exactly the procedure described in that example except that acetic anhydride was substituted by caproic anhydride, propionic anhydride, enanthic anhydride and cyclopentylpropionic anhydride thus affording respectively the corresponding caproates, propionates, enanthates and cyclopentylpropionates of said starting compounds.

*Example VI*

To a solution of 5 g. of compound No. 6 in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced Δ⁵-19-nor-10α-pregnene-3β,17α-diol-20-one dicaproate (Cpd. No. 37).

The compounds Nos. 7, 11, 12, 18, 19, 23 and 24 were treated in accordance with the latter procedure, thus yielding respectively:

Cpd. No.:
  38. 16α-methyl-Δ⁵-19-nor-10α-pregnene-3β,17α-diol-20-one dicaproate.
  39. Δ¹⁽¹⁰⁾-19-nor-5α-pregnene-3β,17α-diol-20-one dicaproate.
  40. 16α-methyl-Δ¹⁽¹⁰⁾-19-nor - 5α-pregnene - 3β,17α-diol-20-one dicaproate.
  41. Δ⁴-19-nor-10α-pregnen-17α-ol-3,20-dione caproate.
  42. 16α-methyl-Δ⁴-19-nor-10α - pregnen-17α-ol-3,20-dione caproate.
  43. Δ¹-19-nor-5α-pregnen-17α-ol-3,20 - dione caproate.
  44. 16α-methyl-Δ¹-19-nor-5α - pregnen-17α-ol-3,20-dione caproate.

*Example VII*

The starting compounds of Example VI were treated following exactly the procedure described in that example, except that caproic anhydride was substituted by acetic anhydride, propionic anhydride, enanthic anhydride and cyclopentylpropionic anhydride thus affording respectively the corresponding acetates, propionates, enanthates, and cyclopentylpropionates of said starting compounds.

We claim:

1. A compound of the following formula:

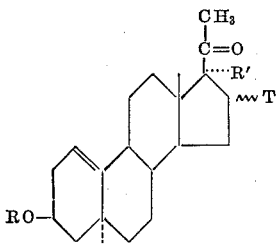

wherein R is a member of the group consisting of hydrogen and a hydrocarbon carboxylic acyl group of less than 12 carbon atoms; R¹ is selected from the group consisting of hydrogen, hydroxyl and a hydrocarbon carboxylic acyloxy group of less than 12 carbon atoms; T is a member of the group consisting of hydrogen, α-methyl and β-methyl; and R¹ and T together form the group

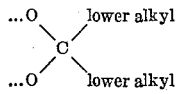

at the 16α,17α-position.

2. Δ¹⁽¹⁰⁾-19-nor-5α-pregnen-3β-ol-20-one.
3. 16α-methyl-Δ¹⁽¹⁰⁾-19-nor-5α-pregnen-3β-ol-20-one.
4. 16β-methyl-Δ¹⁽¹⁰⁾-19-nor-5α-pregnen-3β-ol-20-one.
5. 16α17α-isopropylidenedioxy - Δ¹⁽¹⁰⁾-19-nor-5α-pregnen-3β-ol-20-one.
6. Δ¹⁽¹⁰⁾-19-nor-5α-pregnene-3β,17α-diol-20-one.

7. 16α-methyl-Δ¹⁽¹⁰⁾-19-nor-5α - pregnene-3β,17α-diol-20-one.

8. A compound of the following formula:

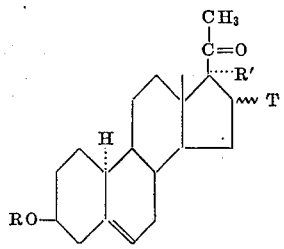

wherein R is a member of the group consisting of hydrogen and a hydrocarbon carboxylic acyl group of less than 12 carbon atoms; R¹ is selected from the group consisting of hydrogen hydroxyl and a hydrocarbon carboxylic acyloxy group of less than 12 carbon atoms; T is a member of the group consisting of hydrogen, α-methyl and β-methyl; and R¹ and T together form the group

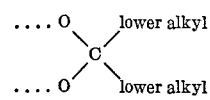

at the 16α,17α-position.

9. Δ⁵-19-nor-10α-pregnen-3β-ol-20-one.
10. 16α-methyl-Δ⁵-19-nor-10α-pregnen-3β-ol-20-one.
11. 16β-methyl-Δ⁵-19-nor-10α-pregnen-3β-ol-20-one.
12. 16α,17α-isopropylidenedioxy-Δ⁵-19 - nor-10α-pregnen-3β-ol-20-one.
13. Δ⁵-19-nor-10α-pregnene-3β,17α-diol-20-one.
14. 16α-methyl-Δ⁵-19-nor-10α-pregnene - 3β,17α-diol-20-one.

15. A compound of the following formula:

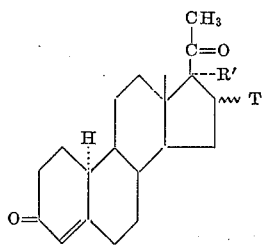

wherein R¹ is selected from the group consisting of hydrogen hydroxyl and a hydrocarbon carboxylic acyloxy group of less than 12 carbon atoms; T is a member of the group consisting of hydrogen, α-methyl and β-methyl; and R¹ and T together form the group

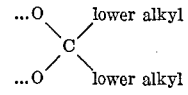

at the 16α,17α-position.

16. Δ⁴-19-nor-10α-pregnene-3,20-dione.
17. 16α-methyl-Δ⁴-19-nor-10α-pregnene-3,20-dione.
18. 16β-methyl-Δ⁴-19-nor-10α-pregnene-3,20-dione.
19. 16α,17α-isopropylidenedioxy - Δ⁴-19-nor-10α-pregnene-3,20-dione.
20. Δ⁴-19-nor-10α-pregnen-17α-ol-3,20-dione.
21. 16α-methyl - Δ⁴-19-nor - 10α-pregnen-17α-ol-3,20-dione.

22. A process for producing predominantly Δ⁵-19-nor-10α-steroids selected from the group consisting of the androstane and pregnane series, which comprises hydrogenating the corresponding Δ¹⁽¹⁰⁾,⁵-19-nor steroid, in an organic solvent in the presence of a hydrogenation catalyst.

23. The process of claim 22 wherein the catalyst is palladium.

24. The process of claim 22 wherein the organic solvent is a lower alkanol.

References Cited by the Examiner

UNITED STATES PATENTS 3,013,945 12/1961 Ilavsky et al. -------- 195—51
3,019,219 1/1962 Cantrall et al. ---- 260—239.55

OTHER REFERENCES

Applezweig Steroid Drugs, pp. 598 and 728, 1962, McGraw-Hill, N.Y. RM-799-A6.

Barton et al.: J. Chem. Soc., pp. 662-31 (1962).

Chen: Tetrahedron, vol. 3, pp. 43-48 (1958).

Ellis et al.: Chem. Abs., 56, col. 4813(a) (1962).

Fieser et al.: Steroids, 1959, pp. 563 and 595, Reinhold Pub. Co., N.Y.

Loewenthal: Tetrahedron, vol. 6, No. 4, pp. 269-303 (1959).

Novacek et al.: Chem. Abs., 56, col. 4831(c) (1962).

Ruggieri: Chem. Abs., 56, col. 12978(i) (1962).

Struck et al.: J. Org. Chem., 26, pp. 3883-7 (1961).

LEWIS GOTTS, *Primary Examiner.*